July 1, 1958 R. T. OETERS 2,841,425

EXTENSIBLE TOOL HANDLE

Filed April 4, 1955

INVENTOR
Richard T. Oeters
BY
Jas. C. Wobensmith
ATTORNEY.

United States Patent Office 2,841,425
Patented July 1, 1958

2,841,425

EXTENSIBLE TOOL HANDLE

Richard T. Oeters, Philadelphia, Pa.

Application April 4, 1955, Serial No. 499,081

1 Claim. (Cl. 287—58)

This invention relates to extensible tool handles, and it relates more particularly to a handle of the type made of a plurality of telescopic tubes. Such handles have a wide variety of uses such, for example, as a part of a lawn mower of the type shown in my previous application for Letters Patent, filed October 6, 1953, Serial No. 384,427, now Patent No. 2,809,490.

Such handles are also useful for window cleaners, mops, brushes, golfball retrievers, and other tools, for reaching to desired places. Another very useful purpose of such handles is in connection with fruit gathering devices used in orchards and similar places.

The principal object of the present invention is to provide a novel form of gripping device forming a part of an extensible tool handle made of a series of tubes telescoped one within the other to hold the same in desired adjusted relationship.

A further object of the invention is to provide, in an extensible tool handle, a gripping device of the character aforesaid, which may be easily, conveniently, and rapidly manipulated for its intended purpose by persons of relatively little skill.

A further object of the invention is to provide, in an extensible tool handle, a gripping device of the character aforesaid, which will be simple and inexpensive in construction, but very efficient in its action.

The nature and characteristic features of the present invention will be more readily understood from the following description, taken in connection with the accompanying drawing forming part hereof, in which.

Figure 2:
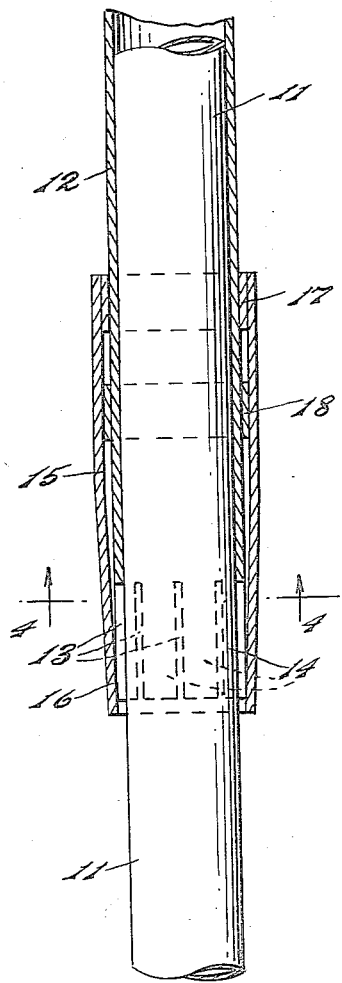
Fig. 2 is an enlarged view, partly in section and partly in elevation of a portion of the handle, showing the construction and arrangement of the gripping device, the parts of the same being shown in operative or gripping positions.

It should, of course, be understood that the description and drawing herein are illustrative merely, and that various modifications and changes may be made in the construction and arrangement shown without departing from the spirit of the invention.

Referring to the drawing, the tool handle is made of a plurality of telescopically arranged tubes whereby the same may be slid longitudinally with respect to each other and the handle thereby shortened or extended to the desired length.

Figure 1:
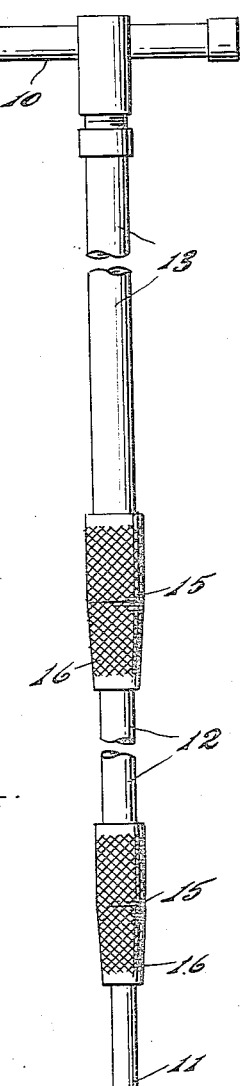
Figure 1 is a side elevation of an extensible tool handle embodying the main features of the present invention.
Figure 4:
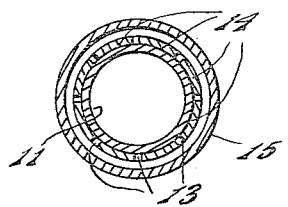
Fig. 4 is a transverse section taken on the line 4—4 of Fig. 2.
Figure 5:
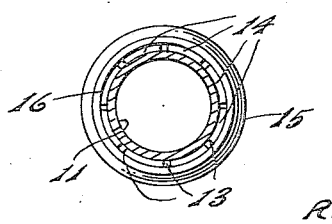
Fig. 5 is a transverse section taken on the line 5—5 of Fig. 3.

In Fig. 1 of the drawing there is shown a tool handle of the present invention, of the type applicable to a lawn mower to enable the cutter mechanism of the mower to be used on high banks, under trees and bushes, and at other inaccessible and difficult places. Such a handle may be provided at one end with a cross bar 10, and may be composed of three tubes 11, 12, and 13, slidably mounted; the smallest tube 11 being mounted within the intermediate sized tube 12, and the intermediate sized tube 12 being mounted within the largest tube 13. The cross bar 10 froms no part of the present invention and in many applications of the handle proper such cross bar may be dispensed with.

The present invention relates more particularly to the means for securing the tubes with respect to each other when they have been brought to the desired lengthwise adjusted positions.

Figure 3:
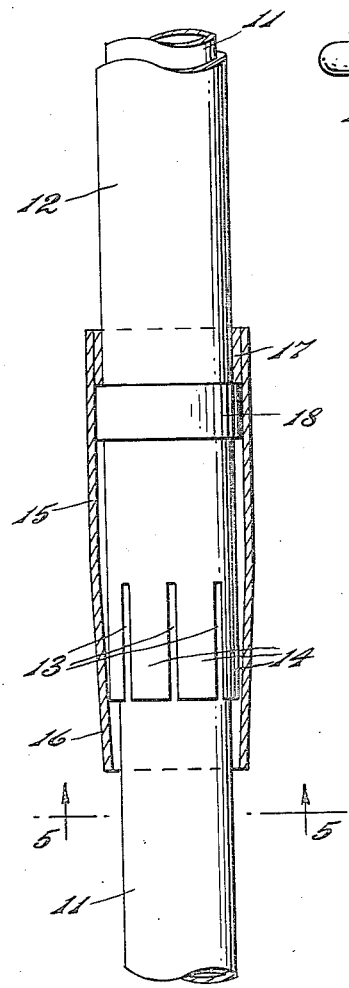
Fig. 3 is a view somewhat similar to Fig. 2, but with the parts shown in released positions whereby the internal tube may be moved longitudinally with respect to the external tube.

The internal tube 11, when the parts of the gripping means carried at one end of the external tube 12 are in the inoperative positions, as shown in Fig. 3 of the drawing, is free to slide lengthwise with respect to said external tube 12.

The end of the external tube 12 is longitudinally slotted as at 13, thereby providing a plurality of fingers 14 at the end of the external tube 12.

Surrounding the end of the external tube 12 is a sleeve 15, one end of which is tapered as at 16, and said tapered portion 16 is so dimensioned that when the sleeve 15 is moved to its outermost position, as shown in Fig. 3, there will be no binding or gripping action upon the ends of the fingers 14 provided, as above set forth, on the end of the external tube. However, on the other hand, when the sleeve 15 is retracted on the end of the external tube 12, the tapered portion of the internal surface of the tapered portion 16 of the sleeve 15 will engage the ends of the fingers 14, provided on the end of the external tube 12, and will force the same inwardly to grip the internal tube 11 and securely hold the same in its adjusted position.

The end of the sleeve 15 remote from the tapered portion 16 is of an internal diameter larger than the external diameter of the external tube 12 which it surrounds, and there is provided internally, at that end of the sleeve 15, a collar 17 fixedly secured thereto in any preferred manner, which slidably engages the outer surface of the external tube 12.

The external tube 12 is also provided, adjacent the end thereof on which the fingers 14 are provided, with a collar 18 fixedly secured thereto in any preferred manner.

The collar 18 carried by the external tube 12 is so located as to limit the movement of the gripping sleeve 15 when the same is brought to the inoperative position, thereby to permit the internal tube 11 to freely slide within the tube 12. The collar 17, carried internally at the end of the sleeve 15, will contact the collar 18, carried by the external tube 12, when the gripping sleeve 15 is in the inoperative position as shown in Fig. 3, and thereby the gripping sleeve will be retained in position on the end of the tube 12 for convenient operation by the user.

The largest tube 13, shown in Fig. 1 of the drawing, is also provided, at one end thereof, with an arrangement similar to that above described, for the purpose of securing the intermediate tube 12 in adjusted positions with respect to said largest tube 13.

The exterior surfaces of the gripping sleeves 15 are preferably knurled so as to afford a rough, hand engaging, surface to facilitate the operation and to enable the user to exert the requisite force to insure a proper gripping action.

The operation of the device is quite simple and will be readily understood.

When it is desired to adjust the length of the handle, the desired gripping sleeve 15 is shifted to the free position, as shown in Fig. 3 of the drawing, which will permit the internal tube to be slid longitudinally with respect to its external tube and when the tubes are in the desired relative longitudinal positions, the gripping sleeve 15 may then be moved on the end of the external tube, causing the tapered end portion 16 of said sleeve to engage the fingers at the end of the external tube, bending the same slightly inward to grip the outer surface of the internal tube. It has been found that the gripping action will be greatly facilitated by giving the gripping sleeve a slight rotating movement in addition to the longitudinal movement which effects the gripping action.

I claim:

An extensible tool handle consisting of a plurality of smooth surfaced tubes successively telescoped one within another and longitudinally adjustable with respect to each other, the external tube of each immediately adjacent pair of said tubes being slitted at one end to provide a plurality of fingers at said end, a sleeve mounted on and enclosing the slotted end of each of said outer tubes, said sleeves each being movable longitudinally with respect to the outer tubes with which they are respectively associated, said sleeves each having an internally tapered portion adapted to engage and constrict the aforesaid fingers to cause the same to grip the internal tube of the respective pair when the same is in a desired adjusted position, each of said sleeves being independently and freely rotatable when said sleeves are in inert or nongripping position, each of said sleeves having an internal collar secured thereto and each of the external tubes having a collar fixedly and permanently secured on said tube and located within the aforesaid sleeve, said collars being respectively positioned relatively to limit the longitudinal movement of the sleeves on the ends of the respective external tubes and to retain said sleeves thereon.

References Cited in the file of this patent

UNITED STATES PATENTS

| | | |
|---|---|---|
| 445,440 | Davis et al. | Jan. 27, 1891 |
| 1,667,485 | Macdonald | Apr. 24, 1928 |
| 1,795,296 | De Zeng | Mar. 10, 1931 |
| 2,098,581 | Jones | Nov. 9, 1937 |
| 2,618,496 | Johnson | Nov. 18, 1952 |
| 2,647,001 | Andersson | July 28, 1953 |